US009679561B2

(12) United States Patent
Bangalore et al.

(10) Patent No.: US 9,679,561 B2
(45) Date of Patent: Jun. 13, 2017

(54) SYSTEM AND METHOD FOR RAPID CUSTOMIZATION OF SPEECH RECOGNITION MODELS

(75) Inventors: Srinivas Bangalore, Morristown, NJ (US); Robert Bell, Berkeley Heights, NJ (US); Diamantino Antonio Caseiro, Philadelphia, PA (US); Mazin Gilbert, Warren, NJ (US); Patrick Haffner, Atlantic Highlands, NJ (US)

(73) Assignee: Nuance Communications, Inc., Burlington, MA (US)

( * ) Notice: Subject to any disclaimer, the term of this patent is extended or adjusted under 35 U.S.C. 154(b) by 454 days.

(21) Appl. No.: 13/072,920

(22) Filed: Mar. 28, 2011

(65) Prior Publication Data

US 2012/0253799 A1 Oct. 4, 2012

(51) Int. Cl.
| | |
|---|---|
| *G10L 15/183* | (2013.01) |
| *G10L 15/30* | (2013.01) |
| *G10L 15/22* | (2006.01) |
| *G10L 15/06* | (2013.01) |
| G10L 15/065 | (2013.01) |

(52) U.S. Cl.
CPC ............ *G10L 15/183* (2013.01); *G10L 15/06* (2013.01); *G10L 15/065* (2013.01); *G10L 15/22* (2013.01); *G10L 15/30* (2013.01); *G10L 2015/0635* (2013.01); *G10L 2015/0636* (2013.01); *G10L 2015/228* (2013.01)

(58) Field of Classification Search
CPC ................ G10L 15/183; G10L 15/265; G10L 2015/0631; G10L 2015/0635; G10L 15/08; G10L 15/06; G10L 15/063; G10L 15/197; G10L 17/04; G06F 17/2765; G06F 17/28; G06F 17/2845
USPC .......................... 704/231, 235, 9, 270, 270.1
See application file for complete search history.

(56) References Cited

U.S. PATENT DOCUMENTS

| | | | | |
|---|---|---|---|---|
| 6,167,377 | A * | 12/2000 | Gillick et al. ................ | 704/240 |
| 6,188,976 | B1 * | 2/2001 | Ramaswamy et al. ........... | 704/9 |
| 6,415,248 | B1 * | 7/2002 | Bangalore et al. ............... | 704/1 |
| 6,430,551 | B1 * | 8/2002 | Thelen et al. | |
| 6,526,380 | B1 * | 2/2003 | Thelen et al. ................ | 704/251 |
| 6,901,364 | B2 * | 5/2005 | Nguyen et al. ............... | 704/235 |
| 6,999,931 | B2 * | 2/2006 | Zhou ............................ | 704/275 |
| 7,099,825 | B1 * | 8/2006 | Cook ....................... | 379/202.01 |

(Continued)

*Primary Examiner* — Matthew Baker

(57) ABSTRACT

Disclosed herein are systems, methods, and non-transitory computer-readable storage media for generating domain-specific speech recognition models for a domain of interest by combining and tuning existing speech recognition models when a speech recognizer does not have access to a speech recognition model for that domain of interest and when available domain-specific data is below a minimum desired threshold to create a new domain-specific speech recognition model. A system configured to practice the method identifies a speech recognition domain and combines a set of speech recognition models, each speech recognition model of the set of speech recognition models being from a respective speech recognition domain. The system receives an amount of data specific to the speech recognition domain, wherein the amount of data is less than a minimum threshold to create a new domain-specific model, and tunes the combined speech recognition model for the speech recognition domain based on the data.

20 Claims, 5 Drawing Sheets

(56) References Cited

U.S. PATENT DOCUMENTS

| | | | |
|---|---|---|---|
| 7,139,714 B2* | 11/2006 | Bennett et al. | 704/270.1 |
| 7,254,529 B2* | 8/2007 | Gao et al. | 704/9 |
| 7,308,404 B2* | 12/2007 | Venkataraman et al. | 704/255 |
| 7,310,601 B2* | 12/2007 | Nishizaki et al. | 704/240 |
| 7,328,155 B2* | 2/2008 | Endo et al. | 704/251 |
| 7,567,902 B2* | 7/2009 | Davis et al. | 704/251 |
| 7,584,104 B2* | 9/2009 | Schroeter | 704/258 |
| 7,603,276 B2* | 10/2009 | Yoshizawa | G10L 15/06 704/243 |
| 7,610,204 B2* | 10/2009 | Ruback et al. | 704/277 |
| 7,634,409 B2* | 12/2009 | Kennewick et al. | 704/257 |
| 7,653,604 B2* | 1/2010 | Kemper et al. | 706/20 |
| 7,680,659 B2* | 3/2010 | Gao et al. | 704/236 |
| 7,693,713 B2 | 4/2010 | He et al. | |
| 7,729,913 B1* | 6/2010 | Lee et al. | 704/254 |
| 7,835,911 B2* | 11/2010 | Balchandran et al. | 704/257 |
| 7,840,405 B1* | 11/2010 | Lee et al. | 704/243 |
| 7,930,178 B2 | 4/2011 | Zhang et al. | |
| 7,957,968 B2* | 6/2011 | Gupta et al. | 704/243 |
| 8,015,006 B2* | 9/2011 | Kennewick et al. | 704/236 |
| 8,073,681 B2* | 12/2011 | Baldwin et al. | 704/9 |
| 8,078,467 B2* | 12/2011 | Wu et al. | 704/270 |
| 8,112,275 B2* | 2/2012 | Kennewick et al. | 704/240 |
| 8,150,694 B2* | 4/2012 | Kennewick et al. | 704/257 |
| 8,301,764 B2* | 10/2012 | Konig et al. | 709/224 |
| 8,326,627 B2* | 12/2012 | Kennewick et al. | 704/257 |
| 8,332,224 B2* | 12/2012 | Di Cristo et al. | 704/257 |
| 8,346,555 B2* | 1/2013 | Metz | 704/257 |
| 8,352,245 B1* | 1/2013 | Lloyd | G10L 15/18 704/9 |
| 8,447,608 B1* | 5/2013 | Chang et al. | 704/257 |
| 8,615,389 B1* | 12/2013 | Marcu | G06F 17/2715 704/1 |
| 2002/0032564 A1* | 3/2002 | Ehsani et al. | 704/235 |
| 2002/0087314 A1* | 7/2002 | Fischer | G10L 15/07 704/255 |
| 2002/0087315 A1* | 7/2002 | Lee et al. | 704/256 |
| 2003/0200094 A1* | 10/2003 | Gupta et al. | 704/270.1 |
| 2004/0054530 A1* | 3/2004 | Davis et al. | 704/231 |
| 2004/0220813 A1* | 11/2004 | Weng | G10L 15/183 704/277 |
| 2005/0055210 A1* | 3/2005 | Venkataraman et al. | 704/255 |
| 2006/0212288 A1* | 9/2006 | Sethy et al. | 704/10 |
| 2007/0033004 A1* | 2/2007 | Bangalore et al. | 704/9 |
| 2007/0100618 A1* | 5/2007 | Lee | G10L 15/1822 704/238 |
| 2007/0156392 A1* | 7/2007 | Balchandran et al. | 704/9 |
| 2007/0233488 A1* | 10/2007 | Carus | G10L 15/183 704/257 |
| 2008/0071533 A1* | 3/2008 | Cave et al. | 704/235 |
| 2008/0288249 A1* | 11/2008 | Grobauer et al. | 704/235 |
| 2009/0150156 A1* | 6/2009 | Kennewick et al. | 704/257 |
| 2009/0276380 A1* | 11/2009 | Acero et al. | 706/12 |
| 2010/0076765 A1* | 3/2010 | Zweig et al. | 704/255 |
| 2010/0246837 A1 | 9/2010 | Krause et al. | |
| 2011/0153325 A1* | 6/2011 | Ballinger | G10L 15/30 704/235 |
| 2011/0161077 A1* | 6/2011 | Bielby | 704/231 |
| 2011/0231394 A1* | 9/2011 | Wang et al. | 707/723 |
| 2011/0296374 A1* | 12/2011 | Wu et al. | 717/104 |

* cited by examiner

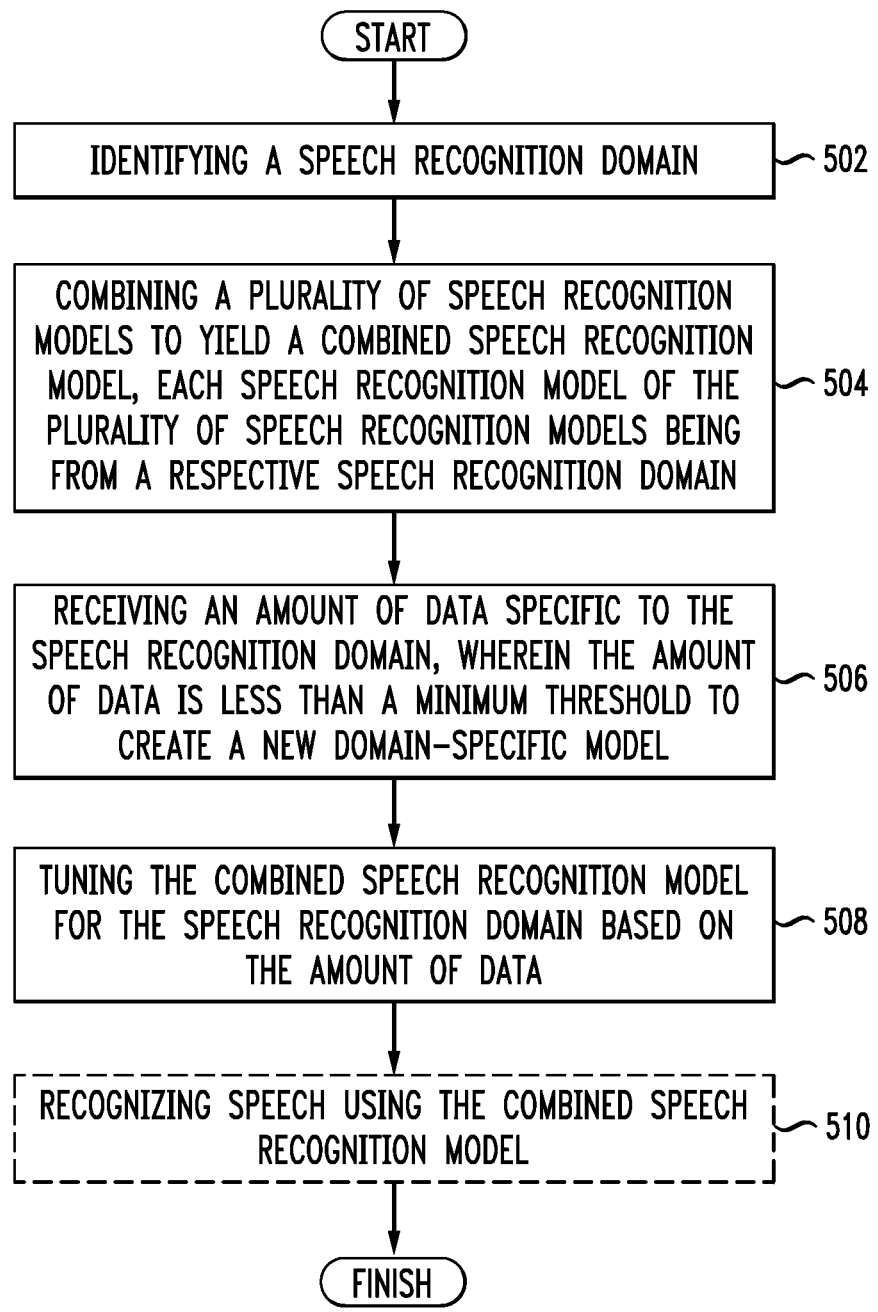

SYSTEM AND METHOD FOR RAPID CUSTOMIZATION OF SPEECH RECOGNITION MODELS

BACKGROUND

1. Technical Field

The present disclosure relates to speech processing and more specifically to combining speech recognition models for a specific domain in place of creating a new model for the specific domain.

2. Introduction

When recognizing speech, speech recognition models help to narrow the focus to a particular speech recognition domain. Different domains help a speech recognizer to deal with specific types of statements, a specific vocabulary, and so forth. In a perfect world where unlimited storage, bandwidth, processing power, time, and other resources are available, a speech recognizer would have access to a customized speech recognition model for every possible domain of interest in order to achieve optimal speech recognition accuracy for that domain. However, this approach requires domain-specific data, which is usually unavailable or very expensive to collect, and a staggering amount of computing resources. Speech recognition with close, but related speech recognition models can provide some useful results, but are not optimal because of differences between the actual domain of the speech and the domain used to recognize the speech.

Further, if a sufficient amount of domain-specific data is available, then a domain-specific model can be built. But often an insufficient amount of domain-specific data is available or is too expensive to gather or produce. The challenge is to provide a customized model with as little domain-specific data as possible. Speech recognition models have been merged in the past, but have been merged inflexibly for only a single application or speech recognition domain.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

This disclosure describes how to recognize speech for a domain of interest by combining speech recognition models from a diverse set of domains, not necessarily the same as or even related to the domain of interest, to perform like a customized model for the domain of interest. The combination of speech recognition models can be performed on a user device or as part of a network-based cloud service.

The approaches set forth herein can be used to rapidly customize speech recognition models for a given domain by combining a bank of speech recognition models. The bank of speech recognition models can represent a number of different domains. A model customized for a particular domain is likely to perform better than a generic or out-of-domain model. This disclosure describes a process of generating a customized model by combining multiple preexisting models and tuning the combination on a small amount of domain-relevant data.

Disclosed are systems, methods, and non-transitory computer-readable storage media for generating a domain-specific speech recognition model. The system identifies a speech recognition domain. Then the system combines a set of speech recognition models to yield a combined speech recognition model, each speech recognition model of the set of speech recognition models being from a respective speech recognition domain. The system receives an amount of data specific to the speech recognition domain, wherein the amount of data is less than a minimum threshold to create a new domain-specific model, and tunes the combined speech recognition model for the speech recognition domain based on the amount of data. The domains can include business, finance, travel, medical, sports, news, politics, entertainment, and education. A mobile device can receive input speech and/or data describing the domain and transmit that information, via a network, to a speech recognition service operating in a cloud computing, grid computing, and/or distributed computing environment.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 illustrates an example method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for generating a domain-specific speech recognition model by tuning a combination of available models when a domain-specific speech recognition model is unavailable and when an insufficient amount of data is available to create a new domain-specific speech recognition model. A brief introductory description of a basic general purpose system or computing device in FIG. 1 which can be employed to practice the concepts is disclosed herein. A more detailed description of combining speech recognition models and tuning the combined model for a specific domain will then follow.

These variations shall be discussed herein as the various embodiments are set forth. The disclosure now turns to FIG. 1.

Figure 1:
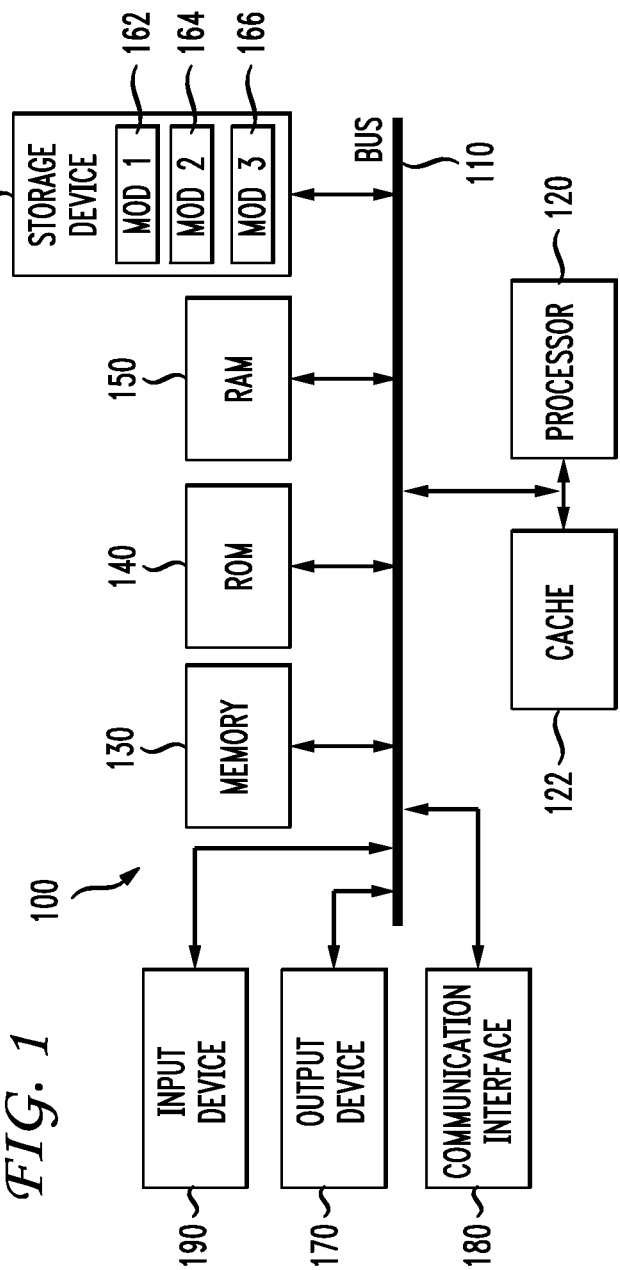
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
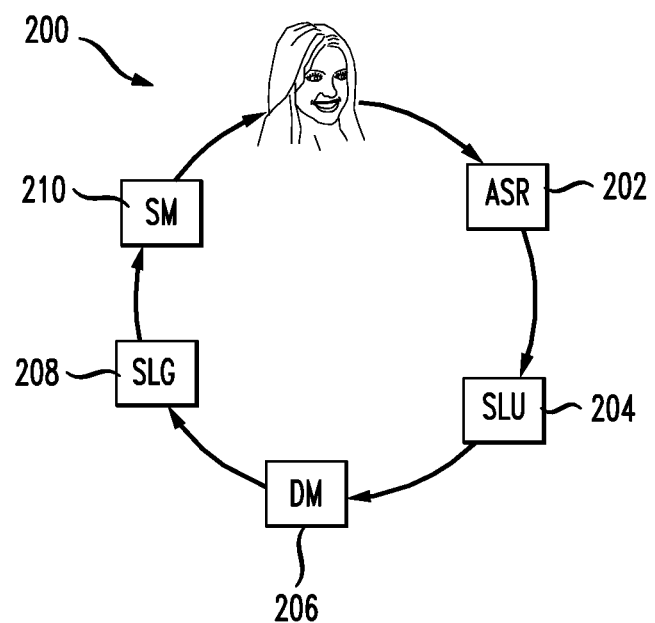
FIG. 2 is an functional block diagram that illustrates an exemplary natural language spoken dialog system.

FIG. 2 is a functional block diagram that illustrates an exemplary natural language spoken dialog system. Spoken dialog systems aim to identify intents of humans, expressed in natural language, and take actions accordingly, to satisfy their requests. Natural language spoken dialog system 200 can include an automatic speech recognition (ASR) module 202, a spoken language understanding (SLU) module 204, a dialog management (DM) module 206, a spoken language generation (SLG) module 208, and synthesizing module 210. The synthesizing module can be any type of speech output module. For example, the synthesizing module can select and play a prerecorded speech segment to a user. Thus, the synthesizing module represents any type of speech output. The present disclosure focuses on innovations related to speech recognition models for use via the ASR module 202, but can also relate to other components of the dialog system.

The ASR module 202 analyzes speech input and provides a textual transcription of the speech input as output. SLU module 204 can receive the transcribed input and can use a natural language understanding model to analyze the group of words that are included in the transcribed input to derive a meaning from the input. The role of the DM module 206 is to interact in a natural way and help the user to achieve the task that the system is designed to support. The DM module 206 receives the meaning of the speech input from the SLU module 204 and determines an action, such as, for example, providing a response, based on the input. The SLG module 208 generates a transcription of one or more words in response to the action provided by the DM 206. The synthesizing module 210 receives the transcription as input and provides generated audible speech as output based on the transcribed speech.

Thus, the modules of system 200 recognize speech input, such as speech utterances, transcribe the speech input, identify (or understand) the meaning of the transcribed speech, determine an appropriate response to the speech input, generate text of the appropriate response and from that text, generate audible "speech" from system 200, which the user then hears. In this manner, the user can carry on a natural language dialog with system 200. Those of ordinary skill in the art will understand the programming languages for generating and training ASR module 202 or any of the other modules in the spoken dialog system. Further, the modules of system 200 can operate independent of a full dialog system. For example, a computing device such as a smartphone (or any processing device having a phone capability) can include an ASR module wherein a user says "call mom" and the smartphone acts on the instruction without a "spoken dialog." A module for customizing speech recognition models can interact with the system at any point, at multiple points, or in a repeated or iterative manner or can be integrated with any of the modules shown in FIG. 2.

Having disclosed some components of a computing system and a generic exemplary natural language spoken dialog system, the disclosure now returns to a discussion of combining and tuning language models. Speech models can be customized for a domain of interest by any combination of the following steps, including combinations that exclude certain steps and/or add other steps. First, a speech recognition service includes a set of preexisting speech models (any number of them) that have been trained on data from a diverse set of domains such as sports, news, politics, international affairs, etc. Some of these preexisting speech models can be closely related with different particular focuses, such as a sports:baseball model, a sports:football model, and a sports:waterpolo model. A user of a speech recognition enabled application or device desires or makes an implicit or explicit request for a customized model for a domain of interest and provides sample data for the domain of interest, such as a finance domain. The speech recognition system combines preexisting models to minimize a quality metric such as perplexity on the data from the domain of interest. Then the speech recognition system tunes, alters, or modifies the combined model with appropriate weight. This tuned speech recognition model serves as the customized model for the domain of interest. The model can be combined at the core n-gram level or at the sentence level.

The speech recognition system can be offered as a service in a computing cloud. Such a service can address the increasing need to recognize any and every audio data that might be sent to the recognizer. The recognition quality can depend heavily on the domain match between available models and the input audio data. However, given that it is not practical or even possible to build a model for every imaginable or possible domain of interest, the approach set forth herein combines preexisting models that cover a diverse set of domains, which can be different from each other and different from the domain of interest, and uses sample data from the domain of interest to produce the best possible speech model given these constraints. The cloud then can contain a small set of speech recognition models which are combined and tuned to produce customized models on demand as and when needed.

Figure 3:
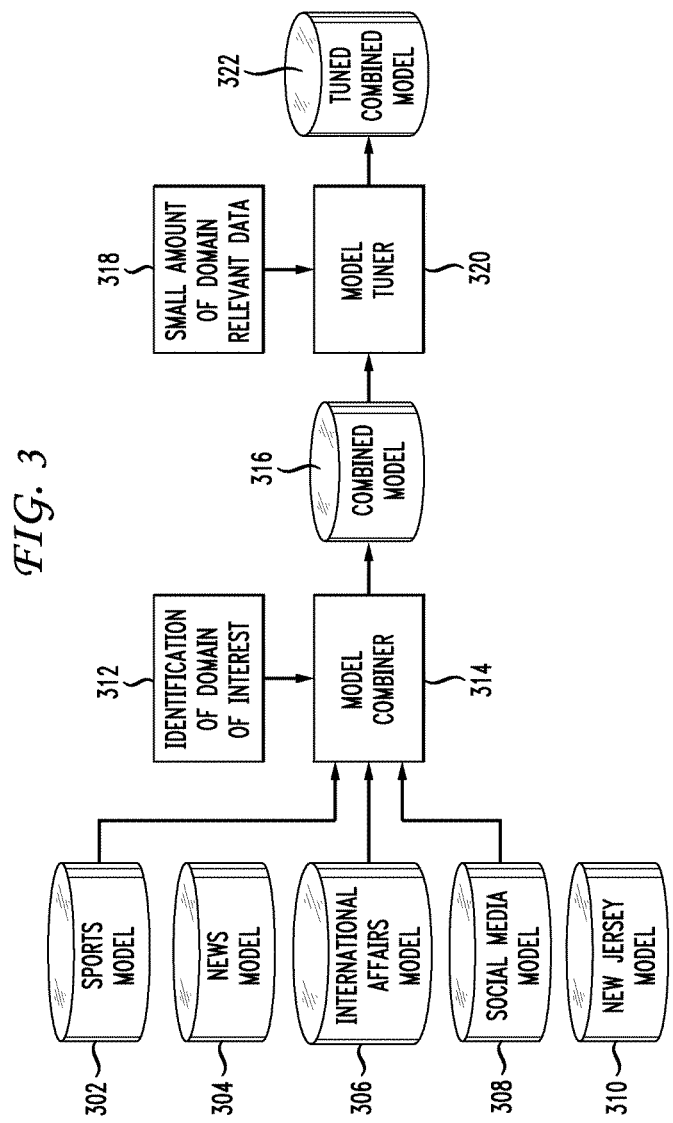
FIG. 3 illustrates an exemplary process flow for combining multiple models and tuning the combined model for a specific speech recognition domain.

The disclosure turns now to FIG. 3, which illustrates an exemplary process flow 300 for combining multiple models and tuning the combined model for a specific speech recognition domain. In this example, a speech recognition system has access to a set of preexisting speech recognition models for various domains, such as a sports model 302, a news model 304, an international affairs model 306, a social media model 308, and a New Jersey model 310. The speech recognition models can be specific to a topic, a region, a particular group of speakers, a particular regional dialect, one or more keywords, and so forth. The system receives an identification of a domain of interest 312 and uses that identification to inform the action of a model combiner 314. The domain of interest can be any of a number of different domains. The approach disclosed herein is sufficiently flexible that the system can handle virtually any speech recognition domain across many different applications. The model combiner 314 (or another entity) can select all or a subset of the set of preexisting speech recognition models. In this case, only the sports model 302, the international affairs model 306, and the social media model 308 are fed to the model combiner 314. This particular selection of models may be for recognizing speech discussing a Facebook posting of a soccer game between Brazil and Korea, for example. However, the selection of models may not be related to the domain of interest. The system can select models based on the models' breadth and expected ability to cover a wider range of expected speech. The model combiner 314 can either produce a new combined model 316 based on the input models, can copy and modify one of the input models based on the input models, or can temporarily or permanently modify one of the input models based on the input models.

The model tuner 320 receives the combined model 316 and a small amount of domain relevant data 318. The small amount of domain relevant data 318 is sufficient to tune the combined model to address the domain of interest, but is insufficient or below a desired minimum threshold to create a new domain specific speech recognition model for the domain of interest from scratch. The model tuner 320 tunes the combined model 316 based on the small amount of domain relevant data 318 to produce a tuned combined model 322. Then the speech recognition system can use the tuned combined model 322 to recognize speech from the domain of interest. In one aspect, the speech recognition system has a feedback loop or self-evaluation routine used to improve the tuning of the tuned combined model 322. The speech recognition system can improve the tuning on a set schedule, one time, and/or on request from a user. The system can recognize a particular user and can save settings or parameters for the tuned combined model 322 in a user profile so that the system can later quickly retrieve and load a particular tuned combined model 322 for recognizing speech from that particular user.

Figure 4:
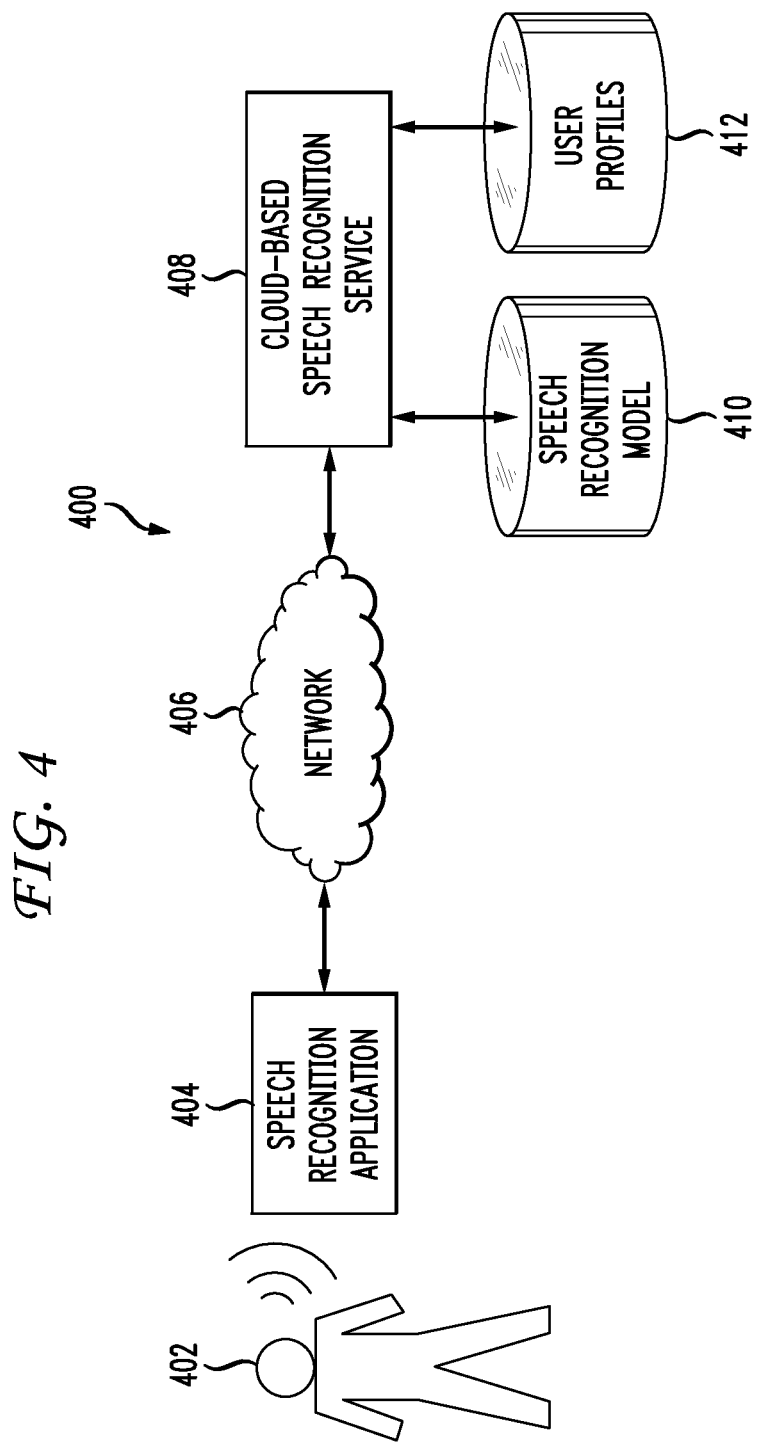
FIG. 4 illustrates an exemplary arrangement for a cloud-based speech recognition service.

FIG. 4 illustrates an exemplary arrangement 400 for a cloud-based speech recognition service. In this arrangement 400, the user 402 submits speech to a speech recognition application 404, such as a voice-enabled search application on a smartphone, tablet computer, desktop computer, or other device. The speech recognition application 404 submits the speech, metadata, and/or other relevant user information to a cloud-based speech recognition service 408 via a communications network 406. The speech recognition service 408 can retrieve information from a user profile 412 for the user 402 to select and combine various speech recognition models 410 as set forth above to recognize speech from the user 402. In one aspect, the user profile 412 contains information to combine and tune a speech recognition model from the set of speech recognition models 410 tailored to specific vocabulary, speech patterns, and speech history of the user. In this way, the speech recognition service 408 can save settings to generate a personalized combined tuned speech model on demand from a set of predefined and/or preexisting speech models 410. As the user speaks and the speech recognition application 404 and/or the speech recognition service 408 tracks the user's speech over time, the user profile 412 can be updated accordingly.

This approach provides for rapid customization of a model for a new not previously encountered domain or rapid customization of a model for a previously encountered domain without storing an entire separate speech recognition model for that domain. The system can store settings, parameters, and/or instructions for combining particular preexisting speech recognition models for a particular domain and/or for a particular user. The data required to combine and tune existing speech recognition models for any of a diverse set of domains is much less than is required to create a new model any of the domains from the ground up. The system can select preexisting models to combine based on an actual or predicted similarity to a model for a desired or indicated domain of interest.

Further, the system can combine personal models from multiple users. For example, the system can harvest data for selecting, combining, and tuning speech recognition models from voicemails, emails, personal profile information, information from family members or co-workers, publicly available information (such as a social networking profile), etc. The system can generate and save multiple personal combined speech recognition models for a single user. The different personal combined speech recognition models can be for different domains, locations, roles, conversations with other users, and so forth.

Having disclosed some basic system components and concepts, the disclosure now turns to the exemplary method embodiment shown in FIG. 5 for generating domain specific speech recognition models. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps. The system 100 identifies a speech recognition domain (502) for which the system does not have access to a preexisting speech recognition model. For example, if the system 100 has (or has access to) a set of preexisting speech recognition models for only domains D, E, F, and G, and the identified speech recognition domain is W, then the system 100 does not have access to W.

The system 100 combines a set of speech recognition models to yield a combined speech recognition model, each speech recognition model of the set of speech recognition models being from a respective speech recognition domain (504). Example speech recognition domains include business, finance, travel, medical, sports, news, politics, entertainment, and education. Other domains exist and can be used with the principles set forth herein. In many implementations, the speech recognition models include at least two speech recognition models from different domains. In other implementations, some of the speech recognition models are closely related but different variations of a main domain.

The system 100 receives an amount of data specific to the speech recognition domain, wherein the amount of data is less than a minimum threshold to create a new domain-specific model (506). The data can include text, speech, transition data, metadata, audio, and other input, such as a user selection from a list on a mobile device or a setting in a stored user profile. The speech recognition domain can be specific to a particular user or class of users.

The system 100 tunes the combined speech recognition model for the speech recognition domain based on the amount of data (508). The system can tune the combined speech recognition model in a cloud computing environment. The system can tune the combined speech recognition model on-demand in response to a user request. The combined speech recognition model and at least one of the set of speech recognition models can be from different domains. As part of tuning the combined speech recognition model, the system can sample the amount of data to use only a portion of the data. For example, the system can have an absolute or dynamic minimum and/or maximum threshold of data, or certain pieces of required information to combine and tune a speech recognition model. The system 100 optionally recognizes speech using the combined speech recognition model (510).

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
receiving speech from a user as part of a speech dialog between the user and a speech recognition service;
identifying, based on the speech, a speech pattern of the user;
identifying, based on the speech pattern of the user, a plurality of speech recognition models stored in a cloud computing storage environment, each speech recognition model of the plurality of speech recognition models being from a respective speech recognition domain;
combining, via a processor, the plurality of speech recognition models, to yield a multi-domain combined speech recognition model;
identifying in the speech a specific speech recognition domain, wherein the specific speech recognition domain does not match a specific speech recognition model in the plurality of speech recognition models;
receiving sample data associated with the specific speech recognition domain, wherein the sample data is independent of the speech dialog between the user and the speech recognition service;

when the sample data is more than a minimum threshold, generating a new domain-specific speech recognition model for the specific speech recognition domain; and
when the sample data is less than the minimum threshold, modifying the multi-domain combined speech recognition model specifically to the specific speech recognition domain by weighting components of the multi-domain combined speech recognition model associated with the specific speech recognition domain to have more influence in recognition of the speech from the user.

2. The method of claim 1, wherein each respective speech recognition domain comprises one of business, finance, travel, medical, sports, news, politics, entertainment, and education.

3. The method of claim 1, wherein each speech recognition model in the plurality of speech recognition models performs automatic speech recognition using a list of words specific to the respective speech recognition domain of the each speech recognition model.

4. The method of claim 1, wherein the modifying of the multi-domain combined speech recognition model is performed on-demand in response to a request.

5. The method of claim 1, wherein the plurality of speech recognition models comprises two speech recognition models from different domains.

6. The method of claim 1, wherein the multi-domain combined speech recognition model and one of the plurality of speech recognition models are from different domains.

7. The method of claim 1, further comprising receiving, in add specific to the specific speech recognition domain, one of text, transition data, metadata, and audio, specific to the specific speech recognition domain.

8. The method of claim 1, wherein the specific speech recognition domain is specific to speech patterns of a particular user over time, wherein the speech patterns of the particular user are updated based on the speech.

9. The method of claim 1, wherein the modifying of the multi-domain combined speech recognition model further comprises sampling the speech.

10. The method of claim 1, further comprising recognizing additional speech using one of the new domain-specific speech recognition model and a modified multi-domain combined speech recognition model.

11. A system comprising:
a processor; and
a computer-readable storage medium having instruction stored which, when executed by the processor, result in the processor performing operations comprising:
receiving speech from a user as part of a speech dialog between the user and a speech recognition service;
identifying, based on the speech, a speech pattern of the user;
identifying, based on the speech pattern of the user, a plurality of speech recognition models stored in a cloud computing storage environment, each speech recognition model of the plurality of speech recognition models being from a respective speech recognition domain;
combining the plurality of speech recognition models, to yield a multi-domain combined speech recognition model;
identifying in the speech a specific speech recognition domain, wherein the specific speech recognition domain does not match a specific speech recognition model in the plurality of speech recognition models;
receiving sample data associated with the specific speech recognition domain, wherein the sample data is independent of the speech dialog between the user and the speech recognition service;

when the sample data is more than a minimum threshold, generating a new domain-specific speech recognition model for the specific speech recognition domain; and when sample data is less than the minimum threshold, modifying the multi-domain combined speech recognition model specifically to the specific speech recognition domain by weighting components of the multi-domain combined speech recognition model associated with the specific speech recognition domain to have more influence in recognition of the speech from the user.

12. The system of claim 11, wherein the modifying of the multi-domain combined speech recognition model is performed on-demand in response to a request.

13. The system of claim 11, wherein the plurality of speech recognition models comprises two speech recognition models from different domains.

14. The system of claim 11, wherein the multi-domain combined speech recognition model and one of the plurality of speech recognition models are from different domains.

15. The system of claim 11, the computer-readable storage medium having additional instructions stored which, when executed by the processor, cause the processor to perform operations comprising receiving, in addition to the speech specific to the specific speech recognition domain, one of text, transition data, metadata, and audio, specific to the specific speech recognition domain.

16. A computer-readable storage device having instructions stored which, when executed by a computing device, cause the computing device to perform operations comprising:

receiving speech from a user as part of a speech dialog between the user and a speech recognition service;

identifying, based on the speech, a speech pattern of the user;

identifying, based on the speech pattern of the user, a plurality of speech recognition models stored in a cloud computing storage environment, each speech recognition model of the plurality of speech recognition models being from a respective speech recognition domain;

combining the plurality of speech recognition models, to yield a multi-domain combined speech recognition model;

identifying in the speech a specific speech recognition domain, wherein the specific speech recognition domain does not match a specific speech recognition model in the plurality of speech recognition models;

receiving sample data associated with the specific speech recognition domain, wherein the sample data is independent of the speech dialog between the user and the speech recognition service;

when the sample data is more than a minimum threshold generating a new domain-specific speech recognition model for the specific speech recognition domain; and when the sample data is less than the minimum threshold, modifying the multi-domain combined speech recognition model specifically to the specific speech recognition domain by weighting components of the multi-domain combined speech recognition model associated with the specific speech recognition domain to have more influence in recognition of the speech from the user.

17. The computer-readable storage device of claim 16, wherein combining the plurality of speech recognition models is performed at one of a core n-gram level and a sentence level.

18. The computer-readable storage device of claim 16, wherein the modifying of the multi-domain combined speech recognition model further comprises sampling the speech.

19. The computer-readable storage device of claim 16, having additional instructions stored which, when executed by the computing device, cause the computing device to perform operations comprising recognizing speech using the multi-domain combined speech recognition model.

20. The computer-readable storage device of claim 16, wherein the specific speech recognition domain is specific to speech patterns of a particular user over time, wherein the speech patterns of the particular user are updated based on the speech.

* * * * *